(12) United States Patent
Kupfer

(10) Patent No.: US 9,390,571 B1
(45) Date of Patent: Jul. 12, 2016

(54) CHAIR WITH STORAGE AND CHARGING CAPABILITIES

(71) Applicant: Benjamin Z. Kupfer, New York, NY (US)

(72) Inventor: Benjamin Z. Kupfer, New York, NY (US)

(*) Notice: Subject to any disclaimer, the term of this patent is extended or adjusted under 35 U.S.C. 154(b) by 0 days.

(21) Appl. No.: 14/743,582

(22) Filed: Jun. 18, 2015

Related U.S. Application Data

(60) Provisional application No. 62/014,073, filed on Jun. 18, 2014.

(51) Int. Cl.
*A47C 7/62* (2006.01)
*G07C 9/00* (2006.01)
*A47C 1/14* (2006.01)
*E05G 1/026* (2006.01)
*H02J 7/35* (2006.01)
*H02J 7/00* (2006.01)
*A47C 7/72* (2006.01)

(52) U.S. Cl.
CPC .............. *G07C 9/00563* (2013.01); *A47C 1/14* (2013.01); *A47C 7/62* (2013.01); *A47C 7/72* (2013.01); *E05G 1/026* (2013.01); *H02J 7/0054* (2013.01); *H02J 7/355* (2013.01); *E05G 2700/00* (2013.01)

(58) Field of Classification Search
CPC  G07C 9/00563; E05G 1/026; E05G 2700/00; H02J 7/0054; H02J 7/355; A47C 7/72; A47C 7/62; A47C 1/14

USPC .................. 297/217.3, 217.1, 463.2, 188.08, 297/188.13
See application file for complete search history.

(56) References Cited

U.S. PATENT DOCUMENTS

| | | | | |
|---|---|---|---|---|
| 5,975,630 A | * | 11/1999 | Schreiber ................. | A47C 1/14 297/217.3 |
| 8,002,349 B1 | * | 8/2011 | Pizzuto ................... | A47C 1/143 297/184.11 |
| 8,789,884 B1 | * | 7/2014 | Edelman ................... | A47C 7/62 297/188.08 |
| 2013/0204098 A1 | * | 8/2013 | Chamney ............. | A61B 5/0537 600/301 |

\* cited by examiner

*Primary Examiner* — Milton Nelson, Jr.
(74) *Attorney, Agent, or Firm* — Byrne Poh LLP

(57) ABSTRACT

A chair with storage and/or charging capabilities is provided. In accordance with some embodiments of the disclosed subject matter, the chair comprises: a chair base portion having a space that has been formed in the chair base portion; a chair back portion connected to the chair base portion; one or more arms that extend between the chair base portion and the chair back portion; an adjustable solar panel comprising one or more solar modules that is rotatably connected to an end of the chair back portion by a hinge joint; a safe positioned within the space formed in the chair base portion; and one or more electrical connectors connecting the one or more solar modules to the power storage unit, wherein the one or more electrical connectors are routed through at least a portion of the chair back portion and the one or more arms.

15 Claims, 2 Drawing Sheets

CHAIR WITH STORAGE AND CHARGING CAPABILITIES

CROSS-REFERENCE TO RELATED APPLICATIONS

This application claims the benefit of U.S. Provisional Patent Application No. 62/014,073, filed Jun. 18, 2014, which is hereby incorporated by reference herein in its entirety.

TECHNICAL FIELD

The disclosed subject matter relates to a chair with storage and/or charging capabilities.

BACKGROUND

Many people carry personal belongings, such as a wallet, keys, a passport, and/or one or more mobile devices when going to the beach and they often want a safe and convenient location to store these personal belongings. However, it can be difficult to find storage for these personal belongings that is both convenient and secure.

Accordingly, it is desirable to provide a new chair with storage and/or charging capabilities.

SUMMARY

A chair with storage and/or charging capabilities is provided. In accordance with some embodiments of the disclosed subject matter, a chair with storage and/or charging capabilities is provided, the chair comprising: a chair base portion having a space that has been formed in the chair base portion; a chair back portion connected to the chair base portion; one or more arms that extend between the chair base portion and the chair back portion; an adjustable solar panel comprising one or more solar modules that is rotatably connected to an end of the chair back portion by a hinge joint; a safe positioned within the space formed in the chair base portion, wherein the safe further comprises: a safe body having a compartment; a safe door connected to the safe body that permits access to the compartment; a fingerprint sensor unit connected to the safe door that stores at least one reference fingerprint based on a first fingerprint being applied to the fingerprint sensor unit and causes the safe door to open in response to determining that a second fingerprint that has been applied to the fingerprint sensor unit matches the at least one reference fingerprint; a power source connected to the safe body that stores electrical energy received from the solar panel and provides the electrical energy to the fingerprint sensor unit; and one or more charging units connected to the power source that charge a mobile device placed within the compartment of the safe body; and one or more electrical connectors connecting the one or more solar modules to the power storage unit, wherein the one or more electrical connectors are routed through at least a portion of the chair back portion and the one or more arms.

In some embodiments, the back portion is adjusted to one of a plurality of sitting positions.

In some embodiments, the back portion is adjusted to a flat position and the adjustable solar panel is adjusted to a position using the hinge joint such that an additional chair is stacked onto the chair.

In some embodiments, the space in the chair base portion is formed based on size information corresponding to the safe.

In some embodiments, the chair further comprises a moveable panel that is connected to the chair base portion over the space formed in the chair base portion, wherein the moveable panel conceals the safe. In some embodiments, the chair further comprises a slider that connects the moveable panel to the chair base portion, wherein the slider allows the moveable panel to slide the moveable panel to reveal the safe. In some embodiments, the chair further comprises a hinge that connects the moveable panel to the chair base portion, wherein the hinge allows the moveable panel to rotatably lift away from the safe to reveal the safe.

In some embodiments, the safe is integrated into the space formed within the chair base portion.

In some embodiments, the safe is selected based on a number of mobile devices allowed for placement within the safe. In some embodiments, the safe is selected based on a dimension that accommodates a particular number of personal items for placement within the safe.

In some embodiments, the fingerprint sensor unit connected to the safe door stores a plurality of reference fingerprints that have been applied to the fingerprint sensor unit and causes the safe door to open in response to determining that a fingerprint matching one of the plurality of reference fingerprints has been applied to the fingerprint sensor unit.

In some embodiments, the chair further comprises a converter that converts solar energy received from the one or more solar modules to electrical energy that is stored in the power source.

In some embodiments, the power source receives the electrical energy from one or more batteries, wherein the power source provides the electrical energy to the fingerprint sensor unit and the safe door.

In some embodiments, the one or more electrical connectors are routed through the chair back portion, the chair base portion, and the one or more arms.

In some embodiments, the one or more electrical connectors are placed within channels formed in the chair back portion, the chair base portion, and the one or more arms.

BRIEF DESCRIPTION OF THE DRAWINGS

Various objects, features, and advantages of the disclosed subject matter can be more fully appreciated with reference to the following detailed description of the disclosed subject matter when considered in connection with the following drawing, in which like reference numerals identify like elements.

DETAILED DESCRIPTION

A chair with storage and/or charging capabilities is provided.

In some embodiments, the mechanisms described herein can facilitate storing items in a safe that is integrated within a chair (e.g., a beach chair, a lounge chair, and/or any other suitable type of chair). In some embodiments, the safe can be inserted into a space formed in a base of the chair. In some embodiments, the safe can be a biometric safe that can store one or more reference fingerprints (e.g., those corresponding to a customer who rents the chair), and can be opened in response to determining that a fingerprint applied to a fingerprint sensor connected to the safe matches one of the stored reference fingerprints.

In some embodiments, the safe can be powered by a solar panel connected to a back of the chair. In some such embodiments, the solar panel can additionally power one or more charging units positioned within the safe, thereby allowing one or more mobile devices to be charged while the devices are stored in the safe. Additionally or alternatively, in some embodiments, the safe can be powered by one or more batteries.

Figure 1:
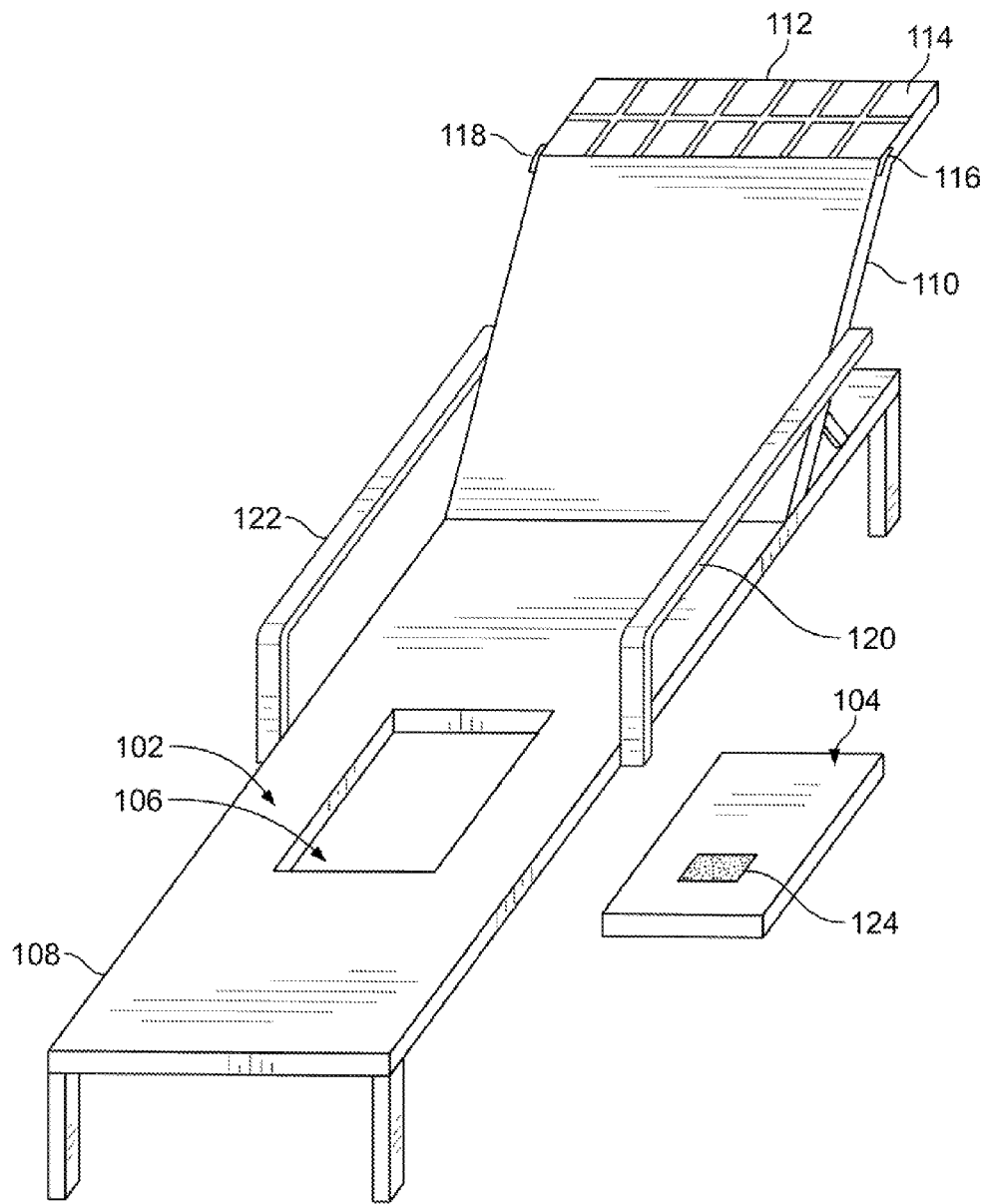
FIG. 1 shows an illustrative example of a chair with an integrated safe in accordance with some embodiments of the disclosed subject matter.

FIG. 1 shows an example of a chair with an integrated safe in accordance with some embodiments of the disclosed subject matter. In some embodiments, a safe 104 can be incorporated into a chair 102, as shown in FIG. 1.

In some embodiments, chair 102 can be made of any suitable material (e.g., plastic, wood, metal, fabric, and/or any other suitable material) and/or any suitable combination of materials. In some embodiments, any portion of chair 102 can be covered with any suitable cushion. In some embodiments, chair 102 can include a base portion 108, a back portion 110, and/or arms 120 and 122. In some embodiments, back portion 110 can be adjusted to any suitable angle with respect to base portion 108. For example, in some embodiments, back portion 110 can be adjusted to an angle that corresponds to a sitting position for a user sitting in chair 102. As another example, in some embodiments, back portion 110 can be adjusted to an angle that corresponds to a reclining and/or lying down position for a user. As still another example, in some embodiments, back portion 110 can be adjusted to an angle suitable for allowing multiple chairs to be stacked (e.g., by adjusting back portion 110 to be parallel to the ground, and/or any other suitable angle).

In some embodiments, safe 104 can be integrated in base portion 108 of chair 102 within a space 106. In some embodiments, space 106 can be created by milling out a suitable portion of base portion 108. In some embodiments, dimensions of space 106 can be based on the dimensions of safe 104. For example, in some embodiments, space 106 can have a length, width, and depth that are similar (e.g., the same measurements, 0.1 inch larger, 1 inch larger, and/or any other suitable dimensions) to a length, width, and depth of safe 104. In some embodiments, space 106 can have a depth that is smaller than a corresponding depth of safe 104 such that safe 104 protrudes from the underside of base portion 108 when safe 108 is inserted in space 106. In some embodiments, safe 104 can be attached to base portion 108 within space 106 using any suitable fastener (e.g., one or more bolts, screws, rivets, and/or any other suitable fasteners).

Figure 2:
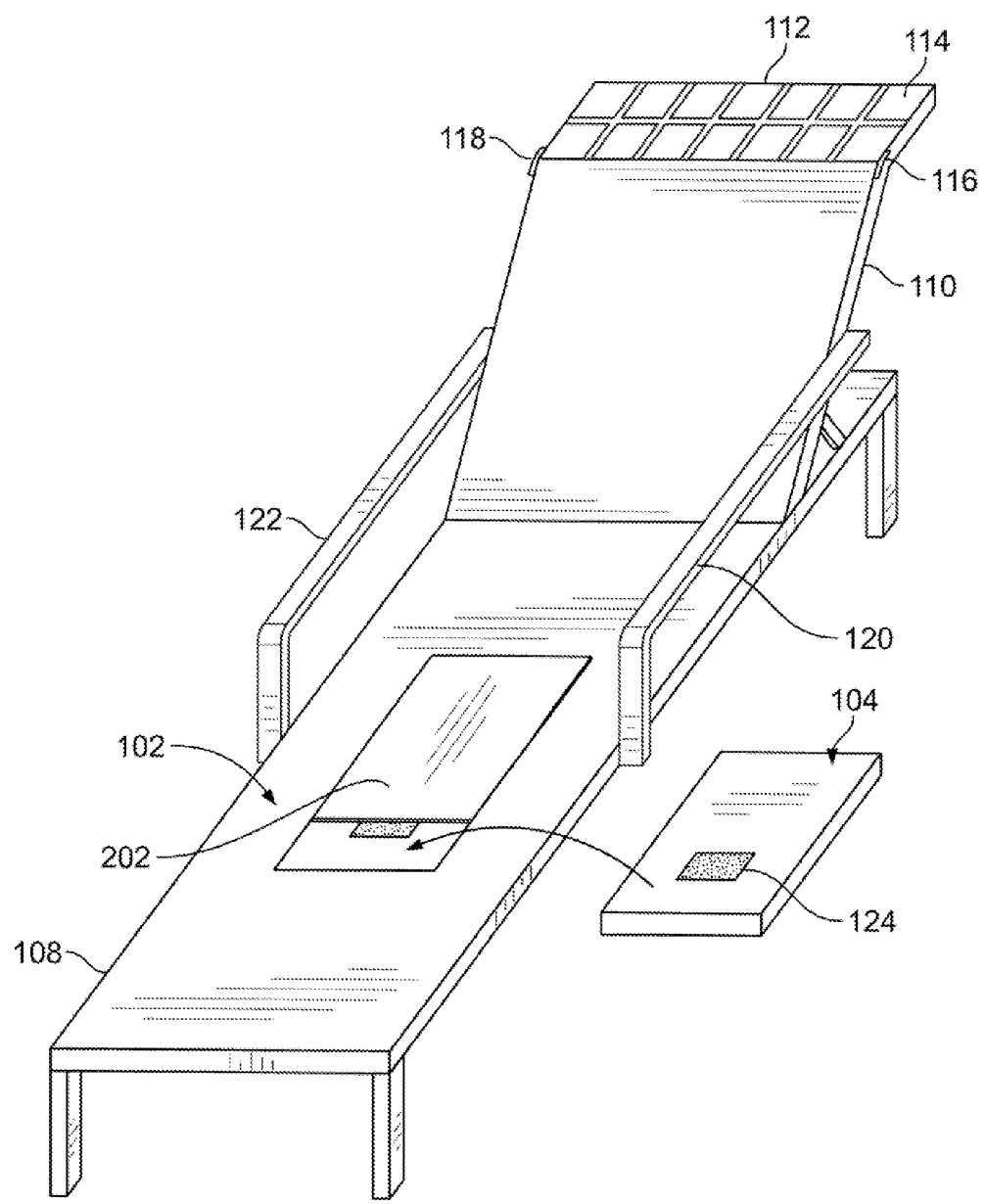
FIG. 2 shows an illustrative example of a chair with a door that can cover an integrated safe in accordance with some embodiments of the disclosed subject matter.

As shown in FIG. 2, in some embodiments, safe 104 can be concealed by a moveable panel 202 connected to base portion 108 that covers safe 104. In some such embodiments, safe 104 can be accessed when panel 202 is moved, e.g., by sliding the panel away from safe 104. In some embodiments, panel 202 can be attached to base portion 108 with one or more hinges, thereby allowing panel 202 to be rotatably lifted away from safe 104.

In some embodiments, one or more dimensions of safe 104 can be based on a number and/or type of items to be stored in safe 104. For example, in some embodiments, safe 104 can be a size that allows a minimum number of items to be stored in safe 104 (e.g., at least one mobile phone, wallet, tablet computer, and watch, and/or any other suitable number and type of items). As another example, in some embodiments, safe 104 can be a size that allows a maximum number of items to be stored in safe 104 (e.g., no more than two mobile phones, and/or any other suitable number and type of items). As a specific example, in some embodiments, the dimensions of safe 104 can be 10.5 in×8.07 in×2.5 in.

In some embodiments, when safe 104 is in an opened configuration, a safe door (e.g., a top panel of safe 104) can be moved to reveal the compartment inside safe 104. For example, in some embodiments, the safe door can be lifted, slid, and/or moved in any other suitable manner.

In some embodiments, safe 104 can be a biometric safe. For example, in some embodiments, safe 104 can require correct entry of a fingerprint and/or any other suitable biometric data to open. In some embodiments, safe 104 can include a fingerprint sensor unit 124. In some embodiments, fingerprint sensor unit 124 can be used to both set a reference fingerprint (e.g., before safe 104 is first used) as well as to receive a test fingerprint in order to open safe 104. Fingerprint sensor unit 124 can incorporate any suitable fingerprint sensing technology (e.g., optical sensing, ultrasonic sensing, capacitive sensing, and/or any other suitable technique).

In some embodiments, safe 104 can store any suitable number (e.g., one, two, three, four, and/or any other suitable number) of reference fingerprints which can be compared to test fingerprints applied to open safe 104 after safe 104 has been locked. In some embodiments, the number of reference fingerprints stored by safe 104 can be limited to a predetermined number, thereby limiting a number of users who can store belongings in safe 104. In some embodiments, a reference fingerprint can include fingerprints from any suitable digits (e.g., thumb, index finger, and/or any other suitable finger) and/or parts of a hand (e.g., a palm). In some embodiments, any stored reference fingerprints can be deleted in any suitable manner, for example, when a particular button (not shown) is pressed.

In some embodiments, safe 104 can be powered through a power source connected to the body of safe 104 that stores electrical energy received from a solar panel 112 connected to back portion 110 of chair 102. As a more particular example, in some embodiments, the electrical energy received from solar panel 112 can be used to power fingerprint sensor unit 124. In some embodiments, solar panel 112 can additionally power one or more charging units contained in safe 104, thereby allowing one or more mobile devices (e.g., a mobile phone, a tablet computer, and/or any other suitable user device) to be charged while the mobile devices are stored in safe 104. In some embodiments, solar panel 112 can include solar modules, such as solar module 114. Any suitable number (e.g., one, two, five, ten, and/or any other suitable number) of solar modules can be included in solar panel 112. In some embodiments, solar panel 112 and solar module 114 can each be of any suitable dimensions. In some embodiments, solar panel 112 can include a converter (not shown) suitable for converting direct current (DC) electricity to alternating current (AC) electricity.

In some embodiments, power from solar panel 112 can be transmitted from solar panel 112 to the power source connected to safe 104 (as well as any charging units in safe 104) via one or more electrical connectors (e.g., wires, cables, and/or any other suitable type of electrical connectors). In some embodiments, the electrical connectors can be routed through any suitable portion of chair 102, thereby allowing the electrical connectors to be hidden and protected from damage. For example, in some embodiments, the electrical connectors can be routed through any of back portion 110, base portion 108, and/or arms 120 and 122.

In some embodiments, solar panel 112 can be adjusted to any suitable angle via hinges 116 and 118. For example, in some embodiments, solar panel 112 can be rotated to be flush with back portion 110. As another example, in some embodiments, solar panel 112 can be rotated to be at an angle suitable for receiving sun exposure during operation. In some embodiments, hinges 116 and/or 118 can be made from any suitable material and can be connected to back portion 110 using any suitable fasteners (e.g., bolts, rivets, screws, and/or any other suitable fastener) and/or any suitable adhesive (e.g., glue, epoxy, and/or any other suitable adhesive). In some embodiments, hinges 116 and/or 118 can be any suitable type of hinges, such as rotary hinges.

In some embodiments, safe 104 can be powered through one or more batteries. In some embodiments, any suitable number (e.g., one, two, four, and/or any other suitable number) and any suitable type of batteries can be used.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A chair comprising:
   a chair base portion having a space that has been formed in the chair base portion;
   a chair back portion connected to the chair base portion;
   one or more arms that extend between the chair base portion and the chair back portion;
   an adjustable solar panel comprising one or more solar modules that is rotatably connected to an end of the chair back portion by a hinge joint;
   a safe positioned within the space formed in the chair base portion, wherein the safe further comprises:
      a safe body having a compartment;
      a safe door connected to the safe body that permits access to the compartment;
      a fingerprint sensor unit connected to the safe door that stores at least one reference fingerprint based on a first fingerprint being applied to the fingerprint sensor unit and causes the safe door to open in response to determining that a second fingerprint that has been applied to the fingerprint sensor unit matches the at least one reference fingerprint;
      a power source connected to the safe body that stores electrical energy received from the solar panel and provides the electrical energy to the fingerprint sensor unit; and
      one or more charging units connected to the power source that charge a mobile device placed within the compartment of the safe body; and
   one or more electrical connectors connecting the one or more solar modules to the power source, wherein the one or more electrical connectors are routed through at least a portion of the chair back portion and the one or more arms.

2. The chair of claim 1, wherein the back portion is adjusted to one of a plurality of sitting positions.

3. The chair of claim 1, wherein the back portion is adjusted to a flat position and the adjustable solar panel is adjusted to a position using the hinge joint such that an additional chair is stacked onto the chair.

4. The chair of claim 1, wherein the space in the chair base portion is formed based on size information corresponding to the safe.

5. The chair of claim 1, further comprising a moveable panel that is connected to the chair base portion over the space formed in the chair base portion, wherein the moveable panel conceals the safe.

6. The chair of claim 5, further comprising a slider that connects the moveable panel to the chair base portion, wherein the slider allows the moveable panel to slide the moveable panel to reveal the safe.

7. The chair of claim 5, further comprising a hinge that connects the moveable panel to the chair base portion, wherein the hinge allows the moveable panel to rotatably lift away from the safe to reveal the safe.

8. The chair of claim 1, wherein the safe is integrated into the space formed within the chair base portion.

9. The chair of claim 1, wherein the safe is selected based on a number of mobile devices allowed for placement within the safe.

10. The chair of claim 1, wherein the safe is selected based on a dimension that accommodates a particular number of personal items for placement within the safe.

11. The chair of claim 1, wherein the fingerprint sensor unit connected to the safe door stores a plurality of reference fingerprints that have been applied to the fingerprint sensor unit and causes the safe door to open in response to determining that a fingerprint matching one of the plurality of reference fingerprints has been applied to the fingerprint sensor unit.

12. The chair of claim 1, further comprising a converter that converts solar energy received from the one or more solar modules to electrical energy that is stored in the power source.

13. The chair of claim 1, wherein the power source receives the electrical energy from one or more batteries, wherein the power source provides the electrical energy to the fingerprint sensor unit and the safe door.

14. The chair of claim 1, wherein the one or more electrical connectors are routed through the chair back portion, the chair base portion, and the one or more arms.

15. The chair of claim 1, wherein the one or more electrical connectors are placed within channels formed in the chair back portion, the chair base portion, and the one or more arms.

* * * * *